June 13, 1933.  R. I. GRAF  1,913,591
APPARATUS AND PROCESS FOR MAKING FAN ROTORS
Filed March 13, 1931  7 Sheets-Sheet 1

INVENTOR
RAYMOND I. GRAF.
BY *Toulmin & Toulmin*
ATTORNEYS

June 13, 1933.  R. I. GRAF  1,913,591
APPARATUS AND PROCESS FOR MAKING FAN ROTORS
Filed March 13, 1931   7 Sheets-Sheet 2

INVENTOR
RAYMOND I. GRAF.
BY Toulmin & Toulmin
ATTORNEYS

INVENTOR
RAYMOND I. GRAF.
BY Toulmin & Toulmin
ATTORNEYS

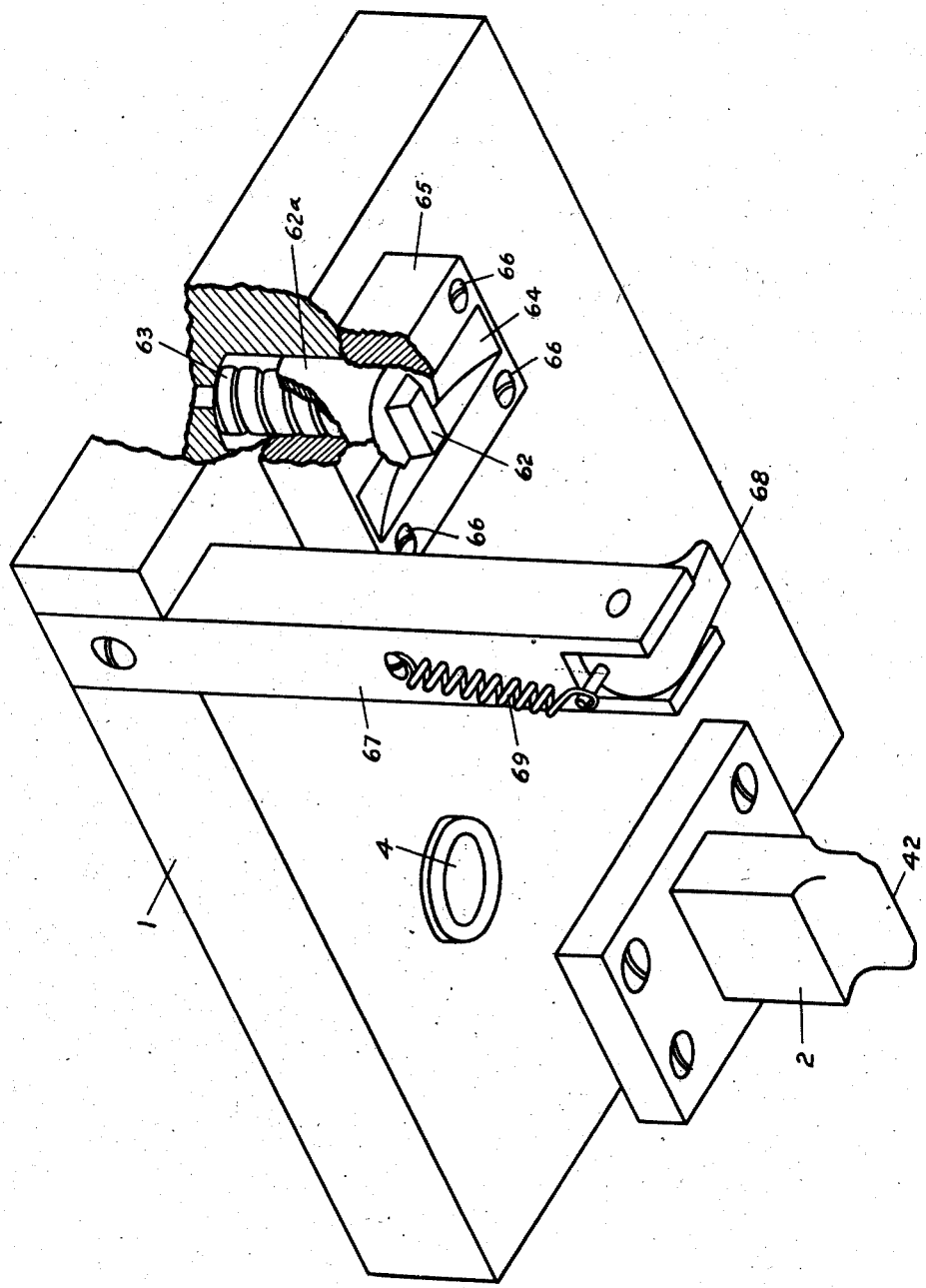

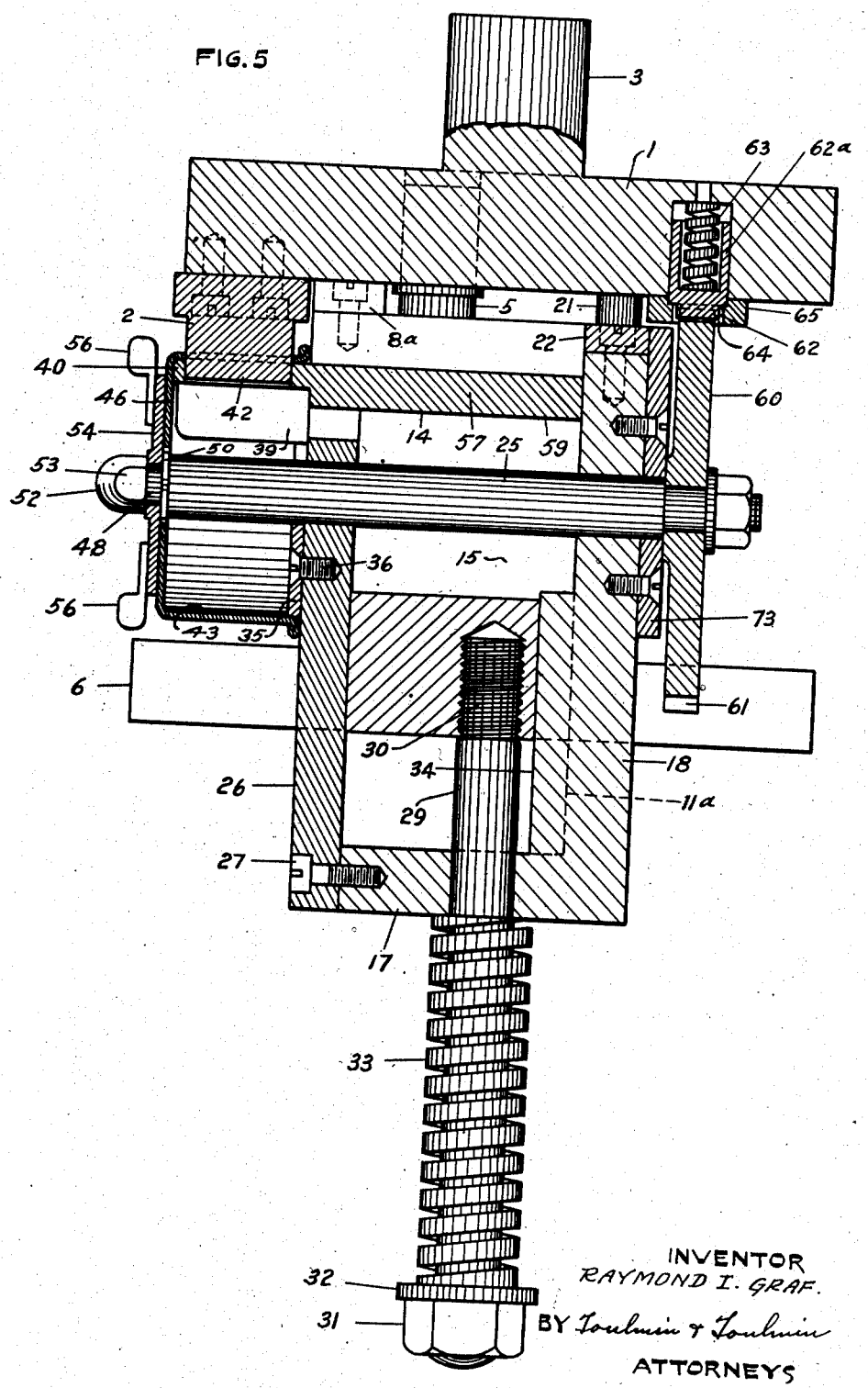

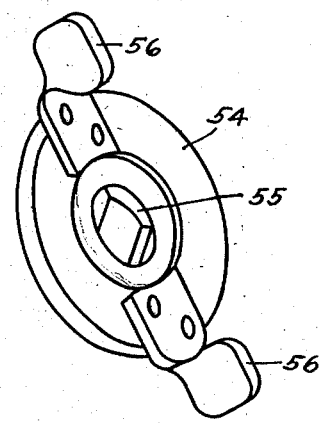
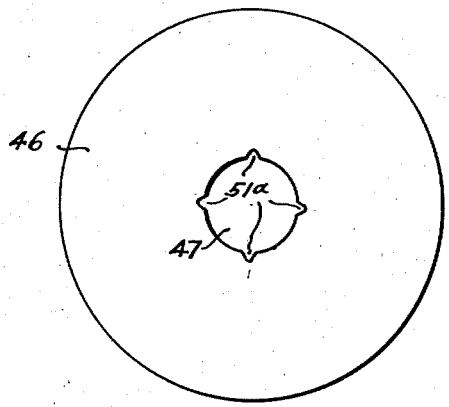
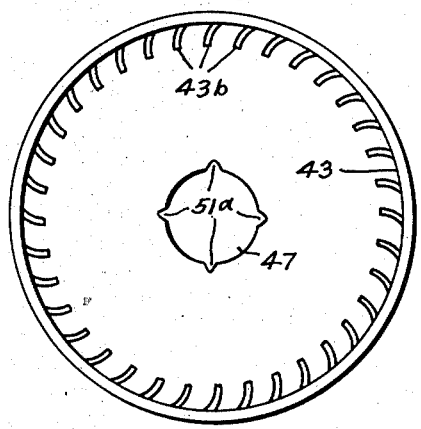
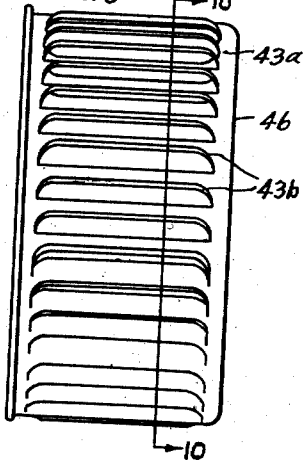
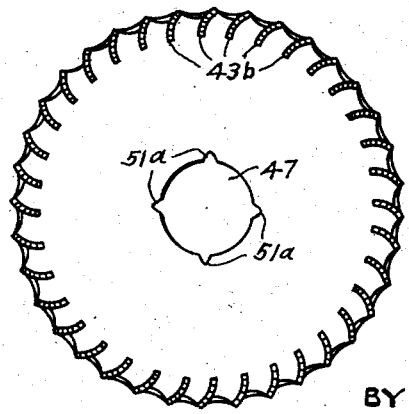

June 13, 1933.  R. I. GRAF  1,913,591
APPARATUS AND PROCESS FOR MAKING FAN ROTORS
Filed March 13, 1931  7 Sheets-Sheet 7
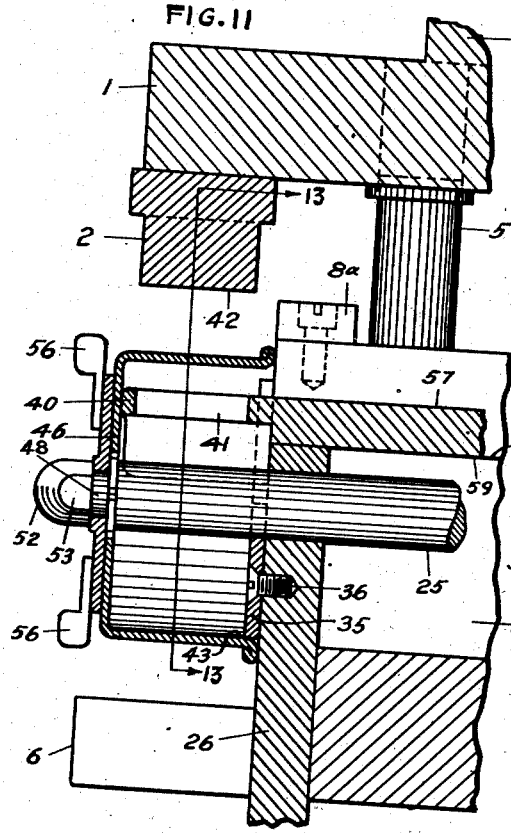
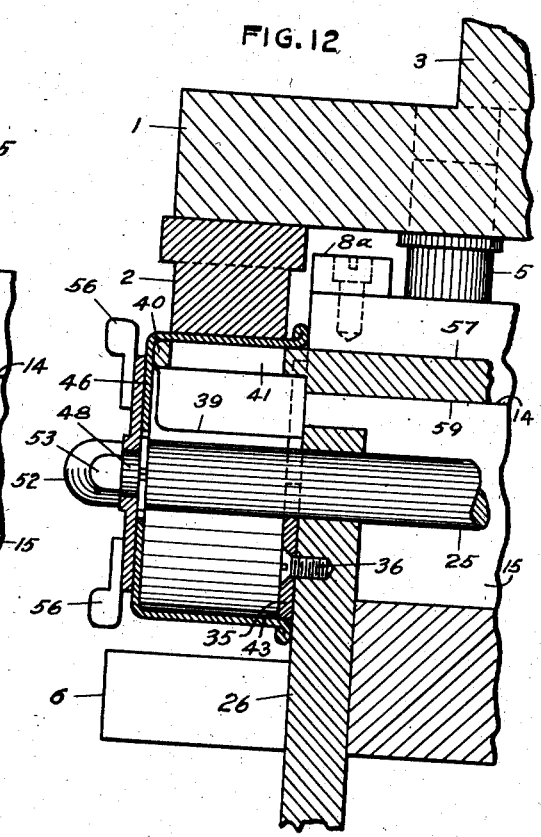
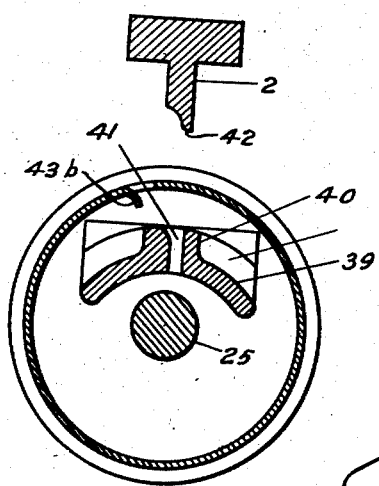
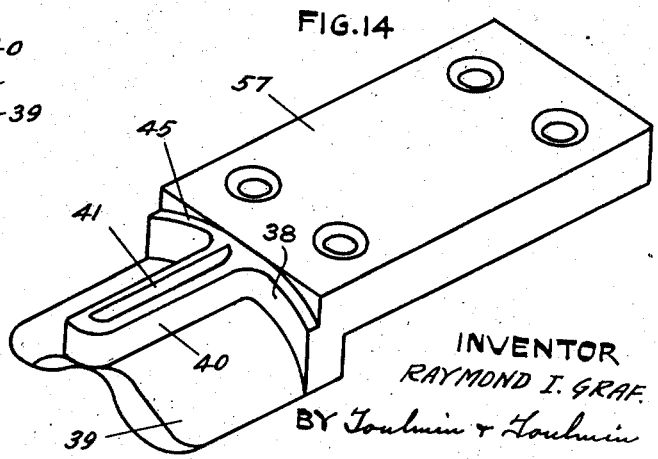
INVENTOR
RAYMOND I. GRAF
BY Toulmin & Toulmin
ATTORNEYS Patented June 13, 1933

1,913,591

UNITED STATES PATENT OFFICE

RAYMOND IVAN GRAF, OF GRAND RAPIDS, MICHIGAN, ASSIGNOR TO AMERICAN BLOWER CORPORATION, OF DETROIT, MICHIGAN, A CORPORATION OF DELAWARE

APPARATUS AND PROCESS FOR MAKING FAN ROTORS

Application filed March 13, 1931. Serial No. 522,271.

This invention relates to a mechanism and method of producing fan wheels.

It is the object of the invention to produce a fan wheel having a plurality of struck-up louvres punched in the side walls of a cup that has been pre-formed out of an integral piece of metal into cup form.

In particular, it is the object of the invention to provide a mechanism and a method by which the cup blank is mounted upon a yieldable die support or slide assembly that is adapted to receive the punch; and, during the punching operation, the punch and its support yieldingly moves the die, die support which constitutes the slide assembly, and cup being punched, and, at the same time, positions and index mechanism which, upon return of the punch and its support, is rotated thereby to move the support over the work to a new position for the next punching operation.

Referring to the drawings:

Figure 4 is a perspective looking upwardly from the rear at the bottom of the punch holder, the punch holder being partially broken away to show the spring plunger which locates the index plate;

Figure 5 is a section through the assembly mechanism with a cup locked in position and being punched;

Figure 6 is a perspective of the clamp plate for locking the cup to be punched on the slide assembly and over the die which is carried by the slide assembly;

Figure 7 is an end elevation of the cup;

Figure 8 is an elevation of the open end of the cup after it has been punched;

Figure 9 is a side elevation thereof after being punched;

Figure 10 is a section on the line 10—10 of Figure 9.

Figure 11 is a section similar to Figure 5 showing the work piece prior to punching.

Figure 12 is a similar view showing the work piece just as it is being punched.

Figure 13 is a section on the line 13—13 of Figure 11 showing the work piece after one fan blade has been punched and it has been rotated to a new position.

Figure 14 is a perspective of the die and die supporting block.

Punch holder

Figure 1:
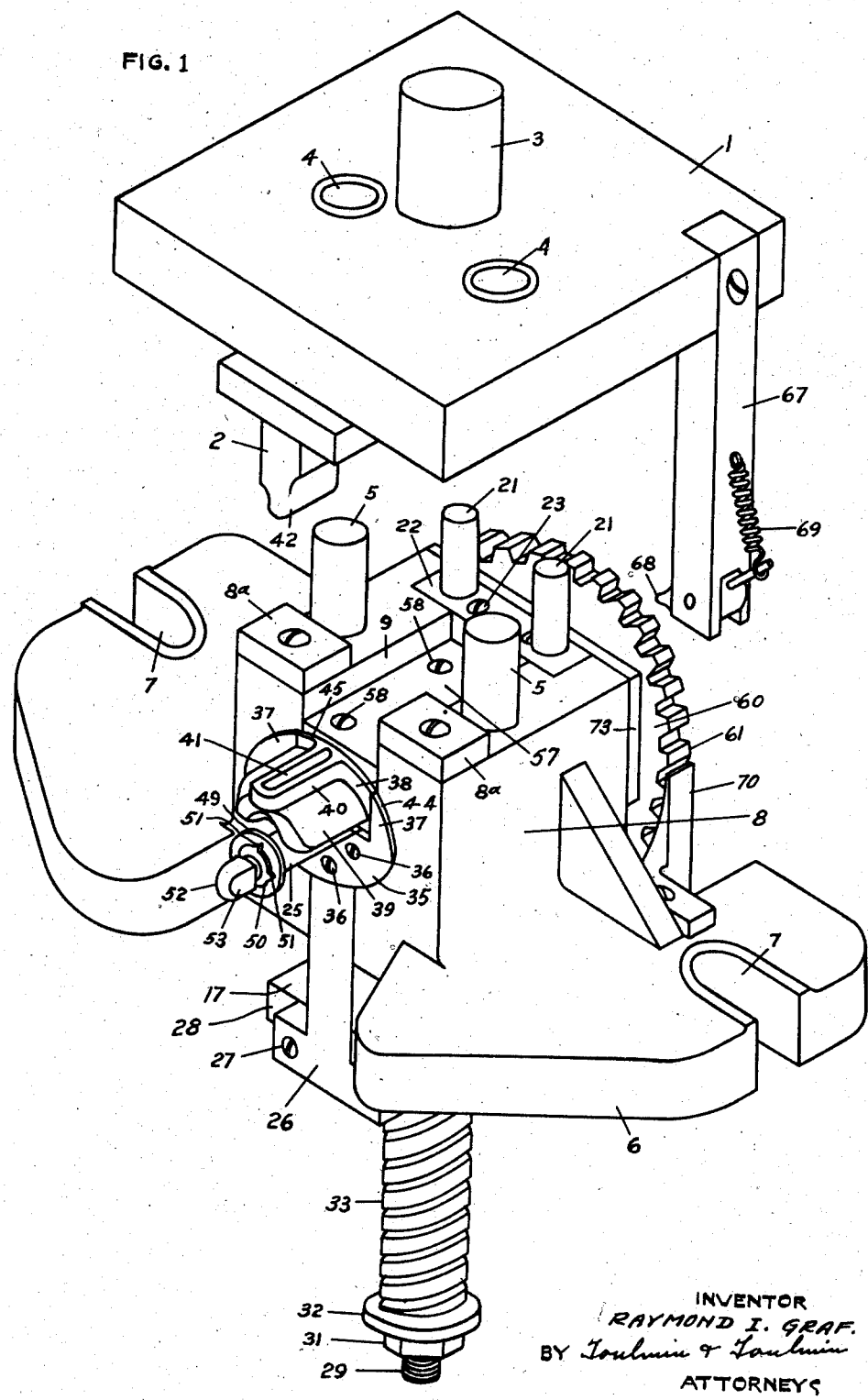
Figure 1 is an isometric perspective with the work piece, such as a cup, removed, and with the cup clamp removed and the press in open position; in this view the die is shown in the slide assembly in actual cutting position but the punch is raised for the purpose of illustration.
Figure 2:
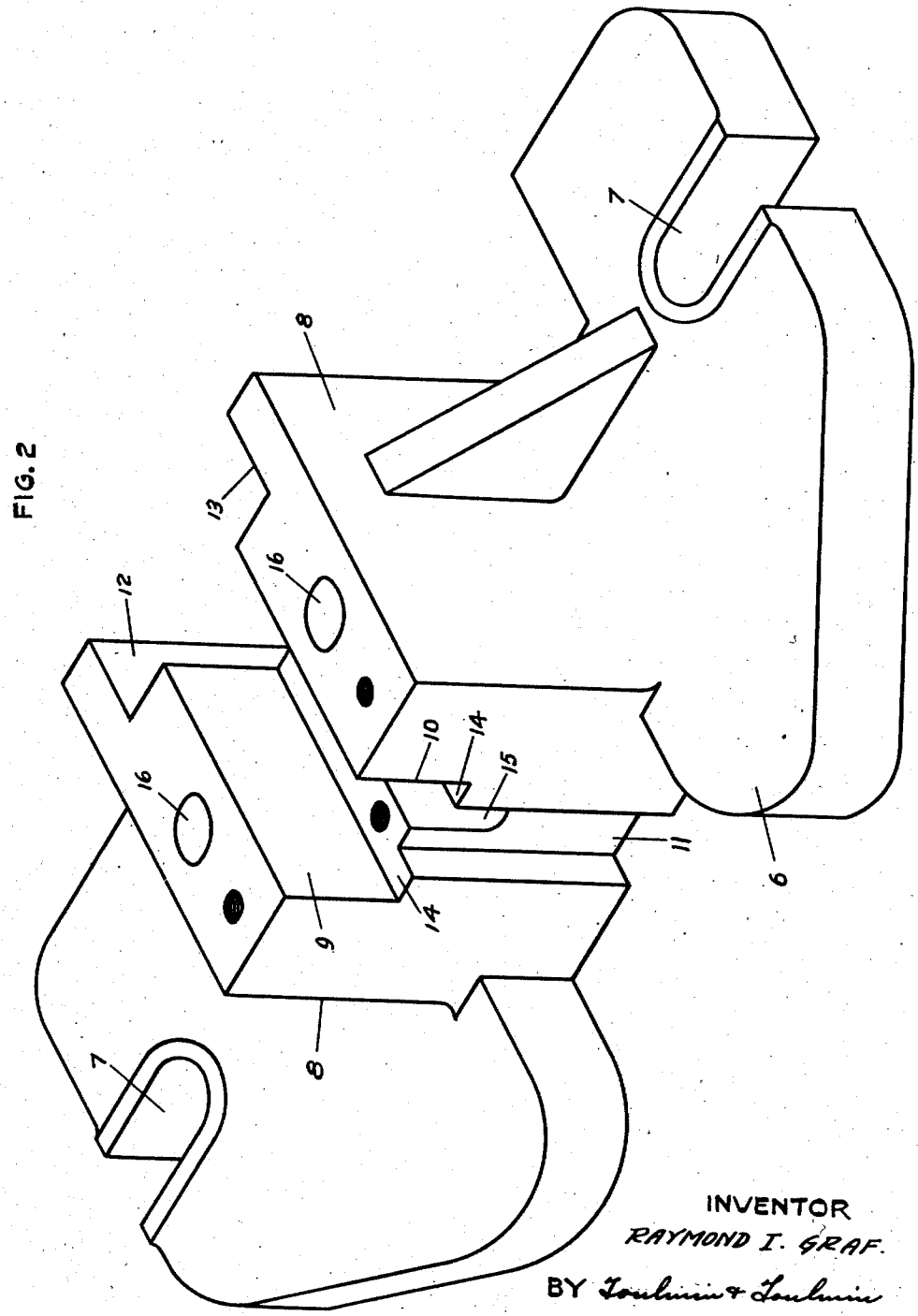
Figure 2 is a perspective of the die shoe.
Figure 3:
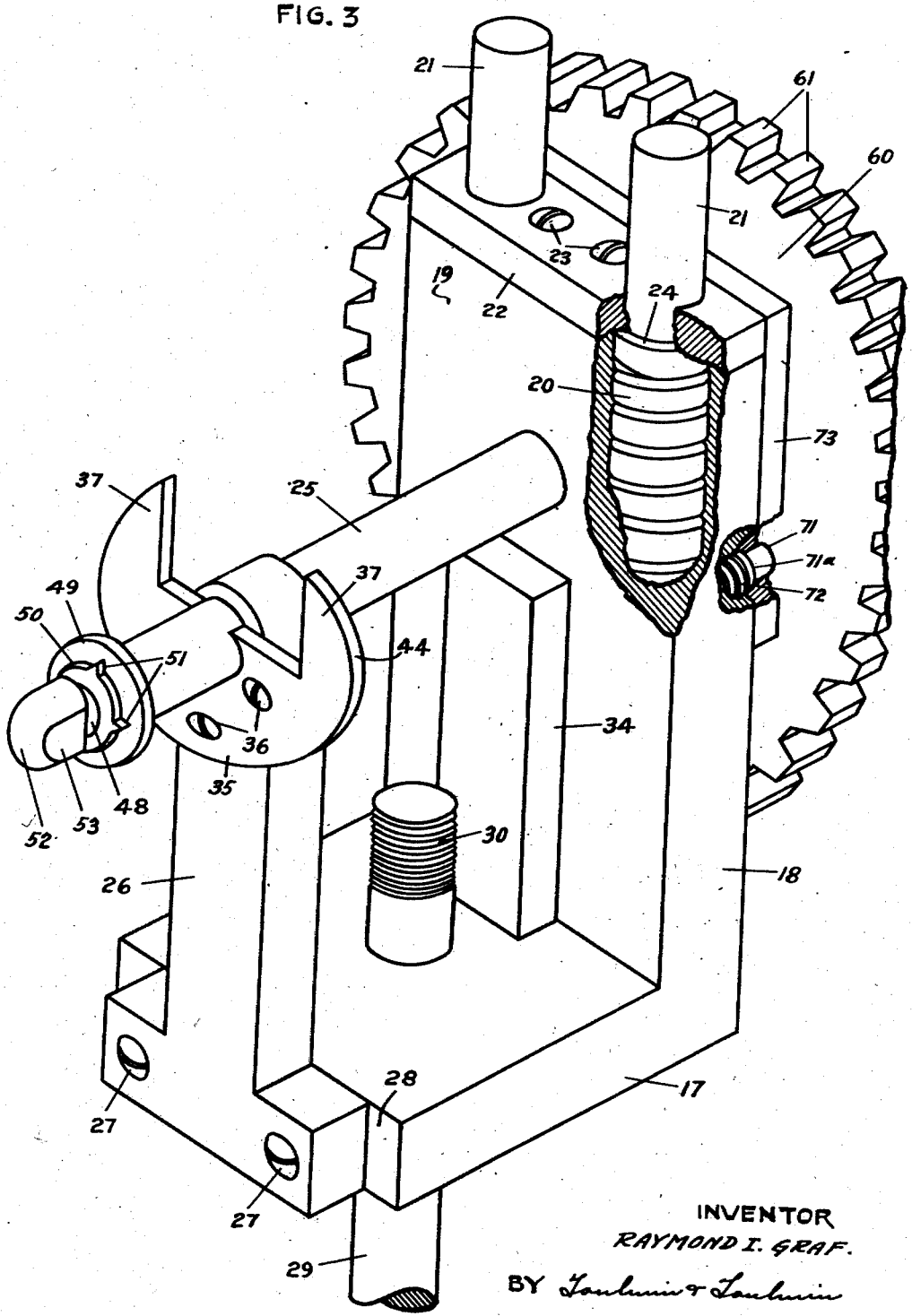
Figure 3 is a perspective of the slide assembly with the frame partially broken away to show one of the spring push pins and to show the spring-pressed friction plunger on the index wheel.

Referring to the drawings in detail, 1 is a punch holder which supports the depending punch 2. The punch holder 1 is provided with any suitable member 3 for locking in the press to be carried by the moving head of the press. It is provided with a pair of apertures 4 which receive the guide pins 5 that serve to align and locate the punch holder and punch.

Die shoe

A die shoe 6 is provided with slots 7 on either side thereof for the bolting of the shoe to the bed of the press. The intermediate portion of the die shoe is provided with a U-shaped abutment with its open end outwardly designated 8 which forms the chamber that receives the reciprocating die assembly hereinafter described. The surfaces 9 and 10 form the side walls of this U-shaped cut away portion, in the outer face of which is a vertical guide way 11, and in the rear face of which is a vertical guide way having the faces 12 and 13 on the sides thereof.

At the lower edges of the side walls 9 and 10 are the horizontal shoulders 14, and between these shoulders a U-shaped slot 15. The abutment walls 8 carry in the apertures 16 the guide pins 5. The upper surfaces of the abutments 8 carry the bumping pads 8a which regulate the exact depth of the stroke of the punch.

Die and slide assembly

The slide for carrying the work cup yieldingly consists of a horizontal block 17 that extends fore and aft beneath the die shoe and extends upwardly at the back of the die shoe between the walls 12 and 13 in the groove thus formed by those walls as at 18. The upper portion 19 of this rear wall of the slide has mounted therein the springs 20 and spring pins 21 which are thrown upwardly by the springs 20 and are resisted in their upward movement through the agency of the plate 22 mounted on the portion 19 by the screws 23, the parts being so arranged that the shoulder 24 on the pin 21 engages the under side of the plate 22. The function of these pins will be hereinafter described. This back plate also serves to support the die shaft 25, the forward end of which is rotatably mounted in the support 26 which is bolted by the bolts 27 to the face 28 of the horizontal plates 17. Through this plate 17 is mounted the spring rod 29 with a sliding fit. The upper end 30 of this rod is threaded into the bottom of the die shoe into which it is thus stationarily mounted. The lower end of this rod has mounted thereon an adjustable nut 31, a spring supporting washer 32 and around the rod 29 is mounted the helical spring 33 which is interposed between the washer 32 and the bottom of the bottom plate 17.

The inside of the back plate 18 is provided with a rib 34 that acts as a guide as it slides in a slot in the rear of the die shoe, marked 11a, which corresponds to the slot 11.

Die mounting

On the outer side of the support 26 partially surrounding the shaft 25 is a circular plate 35 mounted by the screws 36 on the outside of the support 26. This plate 35 has an angular cut away portion on its upper side just over the shaft 25 which forms a pair of spaced ears 37. Mounted in this cut away portion of the plate 35 between the ears 37 is a plate that is of similar rectangular form to the cut away portion in the plate 35 and designated 38. It is provided with an outwardly extending arcuate plate 39 which has formed in the upper face thereof the die wall 40 with the die opening 41 therein for receiving the nose 42 of the punch 2 after it passes through the metal cup which lies over the die and between the die and the punch. The inside periphery of the metal cup adjacent its open end, designated 43, is mounted on the side wall 44 of the plate 35 and the continuation of that side wall at 45 which has the outer surface of the plate 38 that is a part of the die support. Thus, the cup is aligned and held in proper punching position. The depth of the plate 38 is less than the depth of the cut away portion in the plate 35 so that when there is a slight relative movement between the two, the cup can be brought into engagement on its inner side with the surface 45 and the top of the die 40 for punching and when the cup is elevated above those parts, the louvre thus formed will be brought out of the die slot 41 to permit rotary movement about the die 40 to index the cup to the next position for punching the next louvre.

The end of the cup has an end wall 46 with an aperture 47 through which projects the end of the shaft 25 as at 48. Mounted adjacent this end 48 is a plate 49 and an inner plate 50 having indexing projections 51. A spindle 52 with flat sides 53 is mounted in spaced relationship to the plates 49 and 50 on the end of the shaft 25. The indexing projections 51 fit in corresponding notches 51a adjacent the hole 47 of the cup. The clamp plate 54 has a square opening 55 which receives the square head 52 on the shaft 25. This plate 54 is slipped over the head and then rotated into locked position by the fingers 56 so that the cup is clamped in non-rotatable position upon the shaft 25 and is adapted to rotate with the shaft with respect to the die and punch. 57 is the die supporting block attached by the screws 58 to the shoulders 14, thus bridging the slot 15. The underside 59 of the block 57 rests upon the shoulders 14.

Indexing mechanism

The shaft 25 carries on its inner end behind the back plate 18 an indexing wheel 60 with the teeth 61. This wheel is engaged between its teeth by the spring pressed plunger nose 62 pressed downwardly by the spring 63. This plunger nose is carried in the punch holder 1. The nose 62 projects through a slot 64 that receives the teeth 61 in the block 65 attached by screws 66 to the bottom of the punch holder 1. This block serves to retain the plunger 62a carrying the nose 62 against the outward pressure of the spring 63. Thus, this nose, when the punch holder 1 descends, engages between the teeth 61 of the indexing wheel 60 to hold the cup in proper aligned position for the punching operation.

There is also carried on the punch holder 1 a depending finger 67, the lower end of which has a horizontally disposed pawl 68 that is held in position by the spring 69 connected to it and to the finger 67. This pawl is adapted to move upwardly at its inner end as the finger 67 and punch holder 1 descend. It engages with the escapement 70 that acts as a guard over the teeth 61 at this point. This escapement is mounted upon the die shoe 6. However, on the upward stroke, the nose of the detent 68 will engage between the pair of teeth 61 to rotate the index wheel 60, shaft 25 and the cup so that the side wall 43a of the cup will be moved to present a new punching surface for the next punching operation from which is punched the louvre 43b.

The movement of the index wheel 60 is regulated by the brake pin 71, which is spring pressed by the spring 72 against one face of the index wheel 60. It reciprocates in a plate 73 mounted on the back of the back plate 18 while the spring 72 is carried within the back plate 18. There is a shoulder 71a on this pin 71 which engages with the back of the plate 73 so that the plate prevents the pin 71 from being moved completely out of the structure by the spring 72.

Operation

In the operation of this invention the die is stationary. The work piece such as the rotor cup moves with respect to the die and with respect to the punch. The descent of the punch and punch supporting block serves to move the work into engagement with the die against the resistance of the spring 33 and then the punch enters the work and then into the die. Upon the elevation of the punch, the work is likewise elevated by the release of the spring; and the indexing mechanism rotates the work to a new position for a new punching operation.

On the downward stroke of the press, the punch holder 1 engages the opening pins or plungers 21 against the resistance of the springs 20. The springs 20 are stronger than the spring 33. Hence, the spring 33 is compressed as the complete slide assembly carrying the die and work travels downwardly until the cup is settled in place on the die 40. The springs 20 are then compressed as the punch 2 and its nose 42 penetrates the wall of the cup cutting and forming the louvre 43b.

The bumping pads 8a regulate the exact depth of the stroke. In the same period of time, the index plate 60 is located by the spring plunger nose 62, and the pawl 68 passes over the escapement 70 providing sufficient lost motion for proper indexing.

On the upward stroke of the press, the slide assembly is raised by the spring 33, lifting the complete louvre out of the die 40 so that the cup can be rotated in unison with the index plate 60 as it is engaged by the pawl 68 between the teeth 61, thus bringing the cup into position for another cycle to cut the next louvre.

The sequence of operations is as follows:
(1) The punch support travels downwardly until it engages the spring pins 21.
(2) The stronger springs 20 overcome the resistance of the work support spring 33 so that the work descends until it engages the top of the die.
(3) The indexing nose 62 engages between the teeth 61 of the plate 60 to hold the work in punching position.
(4) The punching takes place.
(5) The punch returns and, as it does so, the spring 33 returns the work to its initial position so that the louvre thus formed in the work can clear the die.
(6) The work and index plate are rotated by the engagement of the pawl 68 with the teeth 61 of the index plate 60 to rotate the work to a new position, the outer surface 44 of the plate 35 acting as a guide for this rotation of the work.

Thus, the work is yieldingly brought and yieldingly held against the die, the punch punches the work against the resistance of the yielding means interposed between the punch and die to absorb the shock of punching. Then the punch is removed, the work separated from the die, rotated to a new position, and the next operation continues as heretofore described.

It will be understood that I desire to comprehend within my invention such modifications as may be necessary to adapt it to varying conditions and uses.

Having thus fully described my invention what I claim as new and desire to secure by Letters Patent, is:

1. In a method of forming a fan rotor, positioning and yieldingly supporting a rotor blank in the path of a punch and over a die, moving the blank against the die, moving the punch against the blank over the die and through the blank into the die and by one operation withdrawing the punch, elevating the blank and rotating it to a new position.

2. In a method of forming a fan rotor, positioning and yieldingly supporting a rotor blank in the path of a punch and over a die, moving the blank against the die, moving the punch against the blank over the die and through the blank into the die, and withdrawing the punch, elevating the blank above the die, and at the same time rotating the blank over the die to a new position.

3. In a method of forming a fan rotor, positioning the work for rotation over a die, moving the work against the die, moving a punch towards the work and die, holding the work against lateral movement as the punch approaches, punching the work and by one operation withdrawing the punch, elevating the blank and rotating it to a new position.

4. In a method of forming a fan rotor, positioning the work for rotation over the die, moving the work against the die, moving the punch towards the work and die, holding the work against lateral movement as the punch approaches, punching the work, removing the punch, releasing the holding of the work with respect to the die, elevating the work from the die at the same time and removing by elevating and rotating the punched portion of the work from the die.

5. In a method of forming a fan rotor, positioning the work for rotation over the die, moving the work against the die, moving the punch towards the work and die, holding the work against lateral movement as the punch approaches, punching the work, removing the punch, releasing the holding of the work with respect to the die, elevating the work from the die, removing the punched portion of the work from the die, and at the same time rotating the work over the die to present a new unpunched portion of the work over the die in the path of the punch.

6. In a method of forming a fan rotor, placing a fan rotor work piece over a die above and away from it, yieldingly holding it away from it, by one movement depressing the work against said yielding means into engagement with the die and thereafter punching the work and by one operation withdrawing the punch, elevating the blank and rotating it to a new position.

7. In a method of forming a fan rotor, placing a fan rotor work piece over a die above and away from it, yieldingly holding it away from it, depressing the work against said yielding means into engagement with the die, punching the work, and yieldingly resisting the punching of the work.

8. In a method of forming a fan rotor, holding a rotor work piece in spaced relationship over a die, yieldingly resisting the movement of said work piece to said die, moving a punch towards said work piece and die, yieldingly resisting the movement of said punch towards the work and die, and utilizing said last mentioned yielding means for compressing the first mentioned yielding means to move the work piece on to the die.

9. In a method of forming a fan rotor, holding a rotor work piece in spaced relationship over a die, yieldingly resisting the movement of said work piece to said die, moving a punch towards said work piece and die, yieldingly resisting the movement of said punch towards the work and die, utilizing said last mentioned yielding means for compressing the first mentioned yielding means to move the work piece on to the die, aligning said work piece on the die as the punching takes place.

10. In a method of forming a fan rotor, holding a rotor work piece in spaced relationship over a die, yieldingly resisting the movement of said work piece to said die, moving a punch towards said work piece and die, yieldingly resisting the movement of said punch towards the work and die, utilizing said last mentioned yielding means for compressing the first mentioned yielding means to move the work piece on to the die, aligning said work piece on the die as the punching takes place, releasing said aligning of the work piece, permitting the elevation of the work piece, and rotating the work piece in its elevated position to a new punching position over the die.

11. In combination, a die shoe, a die, a reciprocatory work support cooperating with the die shoe in holding the work while being punched, and a punch.

12. In combination, a die shoe, a die, a reciprocatory work support cooperating with the die shoe in holding the work while being punched, a punch, yielding means between said die shoe and work support adapted to yieldingly resist the bringing of the work into engagement with the die, and means on said punch for compressing said yielding means to so move said work.

13. In combination, a die shoe, a die, a reciprocatory work support, a punch, yielding means between said die shoe and work support adapted to yieldingly resist the bringing of the work into engagement with the die, means on said punch for compressing said yielding means to so move said work, supplementary yielding means between said work support and said punch.

14. In combination, a die shoe, a die, a reciprocatory work support, a punch, yielding means between said die shoe and work support adapted to yieldingly resist the bringing of the work into engagement with the die, means on said punch for compressing said yielding means to so move said work, supplementary yielding means between said work support and said punch of greater strength than the yielding means between the work support and die shoe.

15. In combination, a die shoe, a reciprocatory work support, a die over which said work is supported, a punch adapted to move said work and work support to bring the work into engagement with the die, and means to align said work as the punch approaches the die, punches and is removed therefrom.

16. In combination, a die shoe, a reciprocatory work support, a die over which said work is supported, a punch adapted to move said work and work support to bring the work into engagement with the die, means to align said work as the punch approaches the die, punches and is removed therefrom, and means to rotate said work with respect to said die.

17. In combination, a die shoe, a reciprocatory work support, means for clamping work thereon, said means comprising cooperating parts on the die shoe and the work clamping means, a die mounted on said die shoe, yielding means between said work support and die shoe, a punch adapted to move said work support and work against the die and against said yielding means.

18. In combination, a die shoe, a reciprocatory work support, means for clamping work thereon, a die mounted on said die shoe, yielding means between said work support and die shoe, a punch adapted to move said work support and work against the die and against said yielding means, and means to rotate said work to a new position when the punch and work are moved relatively with respect to said die.

19. In combination, a die shoe, a reciprocatory work support, means for clamping work thereon, a die mounted on said die shoe, yielding means between said work support and die shoe, a punch adapted to move said work support and work against the die and against said yielding means, means to rotate said work to a new position when the punch and work are moved relatively with respect to said die, and supplementary yielding means between said work support and punch for yieldingly resisting the movement of the work support and the punch relative to one another, and the punch relative to the die and the work.

20. In combination, a die shoe, a work support including a circular plate, cooperating with the die shoe to grip the work before and during punching action, a die mounted on the die shoe, yielding means between the work support and die shoe for normally maintaining the work away from the die, a punch and punch support adapted to engage the work support.

21. In combination, a die shoe, a work support, a die mounted on the die shoe, yielding means between the work support and die shoe for normally maintaining the work away from the die, a punch and punch support adapted to engage the work support, yielding means between said work support and punch support.

22. In combination, a die shoe, a work support, a die mounted on the die shoe, yielding means between the work support and die shoe for normally maintaining the work away from the die, a punch and punch support adapted to engage the work support, yielding means between said work support and punch support, of greater strength than the yielding means between the work support and die shoe.

23. In combination, a die shoe, a work support, a die mounted on the die shoe, yielding means between the work support and die shoe for normally maintaining the work away from the die, a punch and punch support adapted to engage the work support, yielding means between said work support and punch support, of greater strength than the yielding means between the work support and die shoe, and aligning means adapted to hold said work against lateral movement during punching by the punch.

24. In combination, a die shoe, a work support, a die mounted on the die shoe, yielding means between the work support and die shoe for normally maintaining the work away from the die, a punch and punch support adapted to engage the work support, yielding means between said work support and punch support of greater strength than the yielding means between the work support and die shoe, aligning means adapted to hold said work against lateral movement during punching by the punch, and indexing means adapted to rotate the work after elevation from the die, said indexing means being operated from said punch support.

25. In combination, a die shoe, a die supported thereon, a bodily reciprocatory work support, means for rotatably supporting work thereon over said die, yielding means for normally maintaining said work and die in separated condition, and a punch adapted to engage said work support to cause the work to engage the die prior to and during the punching by the punch.

26. In combination, a die shoe, a die supported thereon, a bodily reciprocatory work support, means for rotatably supporting work thereon over said die, yielding means for normally maintaining said work and die in separated condition, a punch adapted to engage said work support to cause the work to engage the die prior to and during the punching by the punch, and means on said punch for maintaining said work against lateral movement during punching.

27. In combination, a die shoe, a die supported thereon, a bodily reciprocatory work support, means for rotatably supporting work thereon over said die, yielding means for normally maintaining said work and die in separated condition, a punch adapted to engage said work support to cause the work to engage the die prior to and during the punching by the punch, and means connected to said punch for rotating said work on its work support while it is separated from the die.

28. In combination, a die shoe, a reciprocatory work support, a rotatable work holder mounted thereon, a stationary die, yielding means between the work support and die shoe, a punch, and punch support, yielding means interposed between the punch support and the work support of greater strength than the yielding means between the work support and the die shoe, and indexing means for rotating said work carried by said punch support.

29. In combination, a die shoe, a die, a work support, means for yieldingly resisting relative vertical movement between the die and work carried on the work support, means for effecting rotary movement between the die and the work and work support, means to yieldingly resist lateral movement therebetween, and a punch.

30. In combination, a die shoe, a die, a work support, means for yieldingly resisting relative vertical movement between the die and work carried on the work support, means for effecting rotary movement between the die and the work and work support, means to yieldingly resist lateral movement therebetween, a punch, and means to yieldingly resist the approach of the punch to the work support.

31. In combination, a die shoe, a die, a work support, means for yieldingly resisting relative vertical movement between the die and work carried on the work support, means for effecting rotary movement between the die and the work and work support, means to yieldingly resist lateral movement therebetween, a punch, and means to yieldingly resist the approach of the punch to the work support, said last mentioned yielding means being stronger than the first mentioned yielding means.

32. In combination, a die shoe having spaced abutments, a work support guided thereon therebetween, a shaft carried by said work support extending between said abutments, an indexing wheel on one end of said shaft, and an aligning plate mounted on said work support adjacent said shaft at the other end thereof, a lock on said shaft for locking work thereon around said plate, said plate having an annular slot therein, a die carried between said abutments having a plate extending into the slot of the first mentioned plate but of less depth than said slot, and yielding means interposed between said work support and said die shoe to resist relative movement therebetween.

33. In combination, a die shoe having spaced abutments, a work support guided thereon therebetween, a shaft carried by said work support extending between said abutments, an indexing wheel on one end of said shaft, an aligning plate mounted on said work support adjacent said shaft at the other end thereof, a lock on said shaft for locking work thereon around said plate, said plate having an annular slot therein, a die carried between said abutments having a plate extending into the slot of the first mentioned plate but of less depth than said slot, and yielding means interposed between said work support and said die shoe to resist relative movement therebetween, spring-pressed plungers extending upwardly from said die support, a punch, and a punch support adapted to engage said plungers.

34. In combination, a die shoe having spaced abutments, a work support guided thereon therebetween, a shaft carried by said work support extending between said abutments, an indexing wheel on one end of said shaft, an aligning plate mounted on said work support adjacent said shaft at the other end thereof, a lock on said shaft for locking work thereon around said plate, said plate having an annular slot therein, a die carried between said abutments having a plate extending into the slot of the first mentioned plate but of less depth than said slot, yielding means interposed between said work support and said die shoe to resist relative movement therebetween, spring-pressed plungers extending upwardly from said die support, a punch, and a punch support adapted to engage said plungers, a depending finger on said punch support, a pawl thereon adapted to engage said indexing wheel to rotate it.

35. In combination, a die shoe having spaced abutments, a work support guided thereon therebetween, a shaft carried by said work support extending between said abutments, an indexing wheel on one end of said shaft, an aligning plate mounted on said work support adjacent said shaft at the other end thereof, a lock on said shaft for locking work thereon around said plate, said plate having an annular slot therein, a die carried between said abutments having a plate extending into the slot of the first mentioned plate but of less depth than said slot, yielding means interposed between said work support and said die shoe to resist relative movement therebetween, spring-pressed plungers extending upwardly from said die support, a punch, and a punch support adapted to engage said plungers, a depending finger on said punch support, a pawl thereon adapted to engage said indexing wheel to rotate it, an escapement mounted on said die shoe around a portion of said wheel, said pawl being arranged to pass over said escapement and wheel on its downward stroke and to engage with and rotate said wheel on its upward stroke.

36. As an article of manufacture for punching the rotor of a fan, a punch support, a punch on the support, a depending finger fixed to the support and having a spring pressed pawl mounted on one end thereof, and a spring-pressed aligning plunger in said support.

37. As an article of manufacture for punching the rotor of a fan, an indexing wheel, a punch support, a punch, a depending finger and spring mounted on one end thereof, a spring-pressed aligning plunger, and a grooved retaining plate therefor for receiving the indexing wheel in engagement with said spring-pressed plunger.

38. In combination, a work support, a shaft thereon having a squared head, a spaced shoulder therefrom, interiorly disposed spaced notches thereon spaced from said squared head, said notches adapted to receive similar notches in a work piece, a locking plate having a squared aperture therein to pass over said head on the shaft, and means on said plate for moving it into locking engagement with the work piece on said notches.

39. In a press for forming a fan rotor, a work support, means to rotatably mount a rotor work piece thereon, means engaging the inner periphery thereof for aligning said work piece in its rotary movement, means on the rotary support for aligning the work piece thereon against relative rotary movement, and means to lock said work piece thereon.

40. In a press for forming a fan rotor, a work support, means to rotatably mount a rotor work piece thereon, means engaging the inner periphery thereof for aligning said work piece in its rotary movement, means on the rotary support for aligning the work piece thereon against relative rotary movement, means to lock said work piece thereon, and indexing means for rotating said rotor support, work piece and lock as a unit.

41. In a press for forming a fan rotor, a work support, means to rotatably mount a rotor work piece thereon, means engaging the inner periphery thereof for aligning said work piece in its rotary movement, means on the rotary support for aligning the work piece thereon against relative rotary movement, means to lock said work piece thereon, indexing means for rotating said rotor support, work piece and lock as a unit, and a brake interposed between said work support and said indexing means.

42. In combination, a die shoe, a reciprocatory work support, a stationary die, die shoe pads, a punch and punch support limited in their movement by said pads with respect to said die, yielding means between said work support and said punch support, yielding means between said work support and die shoe, said yielding means being of different strengths, whereby the first mentioned yielding means will cause the compression of the second mentioned yielding means to bring the work on the die, and the first mentioned yielding means will thereafter resist the movement of the punch through the work and into the die.

43. In combination, a die shoe, a reciprocatory work support, a stationary die, die shoe pads, a punch and punch support limited in their movement by said pads with respect to said die, yielding means between said work support and said punch support, yielding means between said work support and die shoe, said yielding means being of different strengths, whereby the first mentioned yielding means will cause the compression of the second mentioned yielding means to bring the work on the die, and the first mentioned yielding means will thereafter resist the movement of the punch through the work and into the die, and means of guiding the punch support with respect to the die shoe and die.

44. In combination, a shaft, an abutment thereon spaced from one end thereof, a plurality of interiorly-disposed aligning shoulders on the face of said abutment, a squared head on said shaft spaced from said aligning shoulders to form a groove therebetween, a locking plate having a squared aperture to pass over said head and to be located in said groove behind said head, and fingers on said locking plate for actuating it.

In testimony whereof, I affix my signature.

RAYMOND IVAN GRAF.